Oct. 10, 1933.   A. LENZ ET AL   1,930,276

CLUTCH THROW-OUT BEARING

Filed March 30, 1931

Inventors
Arnold Lenz &
Charles W. Adams
By Blackmore, Spencer & Flink
Attorneys Patented Oct. 10, 1933

1,930,276

UNITED STATES PATENT OFFICE 1,930,276

CLUTCH THROW-OUT BEARING

Arnold Lenz and Charles W. Adams, Saginaw, Mich., assignors to General Motors Corporation, Detroit, Mich., a corporation of Delaware Application March 30, 1931. Serial No. 526,352

7 Claims. (Cl. 192—98)

This invention relates to bearings, particularly bearings wherein a contact or bearing part of suitable material such as graphite, carbon or a combination of graphite with other carbons or metals is confined by a metallic retainer. It is especially useful in connection with clutch throw-out bearings for automobiles, although its use is not limited to such bearings.

One object of the invention is the provision of a bearing of the type described which will be of but few simple and readily constructed parts which will be permanently assembled as a unit at the factory and which will be less likely to damage or derangement than the types now in use.

Another object is to provide an improved method of securing the throw-out bearing in its collar.

Another object is to provide an arrangement for supplying lubricant to the collar.

Still another object is the provision of means to lubricate such a graphite throw-out bearing made possible by the novel means of mounting the bearing in its collar.

Other objects and advantages will be understood from the following description.

The invention is illustrated in the accompanying drawing in which—

Figure 1:
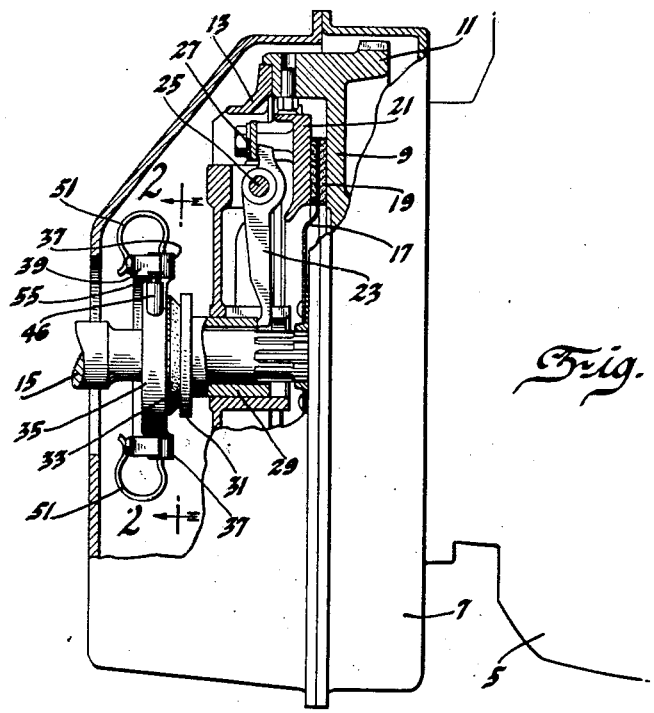
Fig. 1 shows in side elevation and partly in section the clutch through the instrumentality of which the engine of a motor vehicle drives the vehicle.

Referring by reference characters to the drawing, numeral 5 represents an engine and 7 is the clutch and flywheel housing. Within the housing 7 the engine flywheel 9 has a flange 11 to which is secured a cover 13. Driven shaft 15 carries a driven clutch plate 17 having facings 19 on each side. A slidable pressure plate 21 is pressed by conventional springs, not shown, to clutch the driven plate 17 between itself and the face of the flywheel. Levers 23 pivoted at 25 on cover plate 13 engage abutments 27 carried by the pressure plate. The inner ends of these levers are engaged by a sleeve 29 axially slidable and surrounding shaft 15. This sleeve extends rearwardly from cover 13 and has a face 31 engaged by an annular throw-out bearing 33 of graphite, carbon or a combination of graphite with other carbons or metals. The graphite bearing 33 is mounted in a collar 35. The collar 35 in the form shown has trunnions 37 engaged by the parti-circular ends of forks 39 of a clutch release lever 41. Actuation of this lever about its fulcrum 43 presses the bearing 33 against the sleeve end 31 and the sleeve in its axial movement rotates levers 23 and lifts the pressure plate 21 from the driven plate 17 whereby the clutch is released.

The above description is intended only to illustrate the organization in which the invention may be used. It is not to be understood that the invention is restricted to use in this particular relation.

The collar 35 is of substantially circular shape except for the trunnions 37. The collar is recessed or chambered to provide a circular opening to receive the annular graphite bearing 33. The periphery of the recess within the collar is provided with a circular groove 45. It will be observed that the diametrically opposite trunnions are vertically arranged when in position in the clutch. The upper trunnion is bored out to form a hole 47, and the hole 47 extends through the trunnion and into the groove 45. The lower trunnion is bored out to form a hole 49 which does not reach the groove 45.

The holes 47 and 49 receive the ends of springs 51 which extend axially away from the retaining holes 47 and 49 and are curved in shape, their outer ends engaging the arc-shaped ends of forks 39 as shown in Fig. 1 and resiliently holding these ends in engagement with the trunnions.

Substantially parallel with hole 47 is a passage 53 extending vertically from groove 45 through a boss 46 on the collar to a position near the upper trunnion. This passage is externally provided with an oil cup 55.

When the bearing 33 is seated in the chamber of collar 35 lubricant may be supplied for the bearing to circular groove 45 through opening 53. To freely admit the oil, the passage 47 serves as an air vent, and it is to permit it to have this function that the passage 47 is extended to the circular groove 45. It has been found that the provision of an oil supply with a bearing of this kind prevents the bearing from becoming dry and avoids a resulting noise generally described as a "squeal".

Figures 2, 3, 4, 5:
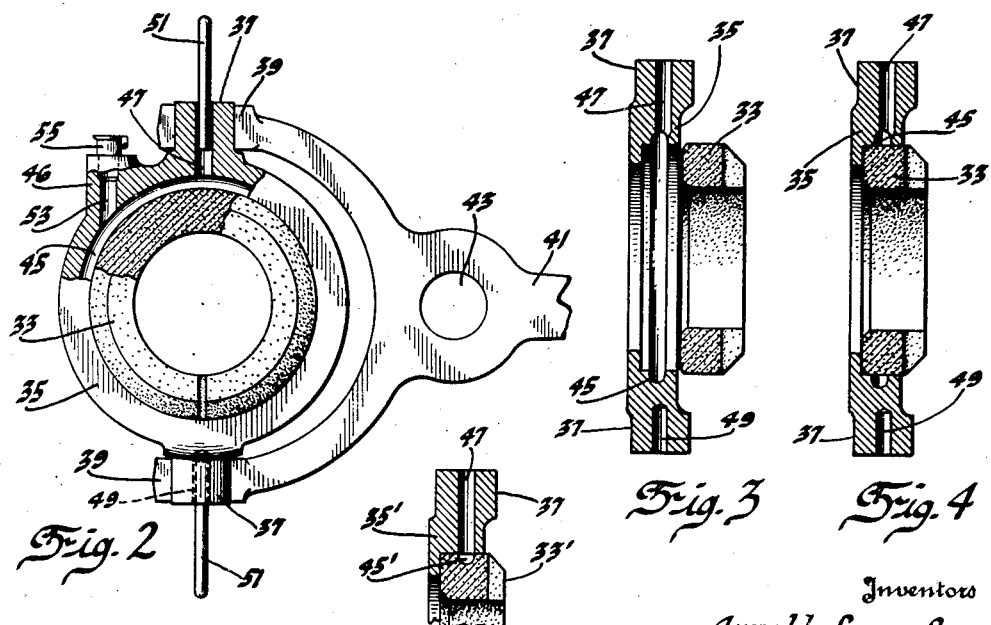
Fig. 2 is a view from line 2—2 of Fig. 1.
Fig. 3 is a vertical section through the throw-out bearing and collar in disassembled relation.
Fig. 4 is a similar view of the parts after assembly.
Fig. 5 is a similar section of a modified form.

Fig. 5 illustrates a modified form in which 35' represents the collar. This collar differs from collar 35 only in the omission of the groove 45. The bearing 33' is mounted in the collar as before. To perform the function of groove 45 of collar 35, there is formed a groove 45' around the periphery of the graphite bearing 33'. The lubrication is effective just as in the case of the groove 45 in the collar.

One important feature of the invention is found in the provision for fastening the bearing in the collar. Heretofore it has been customary to form the bearing and collar separately. The collar has been cast, slotted, machined, drilled, and tapped in order that it may be clamped about the inserted bearing by means of a clamping bolt. This construction has been found unsatisfctory because of the loosening of the bearing in the collar. It has also been proposed to cast the collar about the finished bearing. In such cases there has been much breakage of the collar owing to the incompressibility of the graphite bearing. When the collar does not break in assembly it is likely to do so in subsequent finishing operations on the collar or while in use. This process is also objectionable for the reason that the bearing is likely to be damaged during the finishing operations on the collar.

To improve upon these prior methods of securing the bearing, we have found the following steps very useful. The bearing is prepared in finished form. So also is the collar. The diameter of the recess in the collar is made slightly less than the diameter of the bearing as shown by Fig. 3. The collar is then heated and allowed to shrink upon the bearing as shown by Fig. 4. The differences in diameter must be such that the ring will hold the bearing firmly and the strains be not great enough as to break the collar. It will, of course, be understood that the invention is not limited to a particular difference in diameters. It is within the contemplation of the inventors to use such limits as will allow the collar to grip the bearing without being broken.

Not only is this an improvement in the method of assembly in that it avoids the use of fastening bolts employed in one of the earlier forms and avoids breaking the collar and injury to the bearing in another proposed form of assembly, but it provides the possibility for efficient lubrication. It has been found that the bearing noise is best avoided by keeping the graphite bearing oiled. This lubrication can easily be provided by the annular groove and oil supply when the parts are separately made and shrunk together as described. With the older construction where the collar was split and clamped oil cannot be retained, and when it is attempted to cast the collar on the bearing it is impossible to provide the lubricant groove. With the shrunk on type of collar not only may the oil groove be provided but the tight fit of the collar on the bearing serves as an efficient oil-retaining means. The method of assembly is therefore not only desirable in itself but cooperates with the provision for lubrication to the end of making a better throw-out bearing.

We claim:

1. A clutch throw-out bearing comprising a bearing and a closed metallic collar shrunk thereon, said collar having an inner recess to receive the bearing and an oil groove in the wall of the recess.

2. A clutch throw-out bearing comprising a bearing and a closed metallic collar shrunk thereon, said collar having an inner recess to receive the bearing, an oil groove in the wall of the recess surrounding the bearing and passages communicating with said groove for oil inlet and air venting.

3. In combination, a throw-out bearing for clutches comprising a cup-shaped collar having therewithin a groove, a graphitic bearing tightly fitting in the cup of said collar, said collar having a passage in its wall communicating with said groove.

4. The invention defined by claim 3, said collar having vertically and diametrically opposed trunnions to be engaged by a releasing lever, one of said trunnions having an axial passage communicating with said groove.

5. In combination, a clutch throw-out collar of cup-shape, a graphite bearing secured therein, said collar having a groove in its inner wall surrounding said bearing and an oil feed passage and an air vent passage, said passages extended through the wall of said collar to said groove.

6. The invention defined by claim 5, said collar having diametrically opposite trunnions, one of said feed and vent passages extending axially through one of said trunnions and the other of said feed and vent passages being parallel to the said trunnion passage.

7. The invention defined by claim 5, said collar having diametrically opposite trunnions, an operating lever having forked ends engaging said trunnions, said trunnions having axial holes, springs terminally retained in said holes and engaging said forked ends to hold said lever ends in contact with said trunnions, one of said trunnion holes communicating with said groove to serve as an air vent, said collar also having an oil inlet passage communicating with said groove.

ARNOLD LENZ.
CHARLES W. ADAMS.